United States Patent [19]

Uehara et al.

[11] Patent Number: 4,919,376

[45] Date of Patent: Apr. 24, 1990

[54] COUNTER-BALANCING MECHANISM FOR CAMERA UNIVERSAL HEAD

[75] Inventors: Kenichi Uehara, Kawagoe; Hisashi Tomioka, Asaka, both of Japan

[73] Assignee: Daiwa Manufacturing Co. Ltd., Tokyo, Japan

[21] Appl. No.: 344,865

[22] Filed: Apr. 28, 1989

[30] Foreign Application Priority Data

Nov. 25, 1988 [JP] Japan .................. 63-152494[U]

[51] Int. Cl.⁵ .......................................... F16M 11/10
[52] U.S. Cl. ................................. 248/185; 248/292.1; 248/596
[58] Field of Search ............ 248/184, 183, 185, 280.1, 248/292.1, 571, 584, 592, 594, 596, 575, 578; 74/44, 55, 567, 569; 354/293

[56] References Cited

U.S. PATENT DOCUMENTS

| | | | |
|---|---|---|---|
| 1,977,153 | 10/1934 | Spence | 248/183 |
| 2,111,012 | 3/1938 | Tondreau | 248/183 |
| 2,719,690 | 10/1955 | Zucker | 248/183 |
| 2,998,953 | 9/1961 | O'Connor | 248/183 |
| 3,516,936 | 6/1970 | Burke | 248/596 X |
| 3,814,369 | 6/1974 | Kastholm | 248/596 X |
| 3,924,083 | 12/1975 | Hagey | 248/596 |
| 4,653,709 | 3/1987 | Paldino | 354/293 |
| 4,726,253 | 2/1988 | Russell | 74/569 |

FOREIGN PATENT DOCUMENTS 428025 5/1935 United Kingdom ............... 248/183
2049601 5/1979 United Kingdom .

Primary Examiner—J. Franklin Foss
Attorney, Agent, or Firm—Armstrong, Nikaido, Marmelstein, Kubovcik & Murray

[57] ABSTRACT

This invention relates to a camera universal head enabling said camera to vertically rotate or swing and, particularly to a counter-balancing mechanism for balancing rotative moments caused by the displacement of center of gravity in said movement of said camera, and this counter-balancing mechanism for a camera universal head can be formed in a small size and effect a perfect balancing.

2 Claims, 2 Drawing Sheets

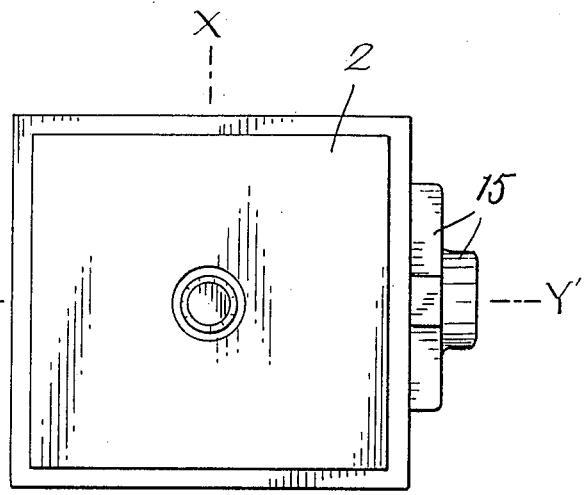
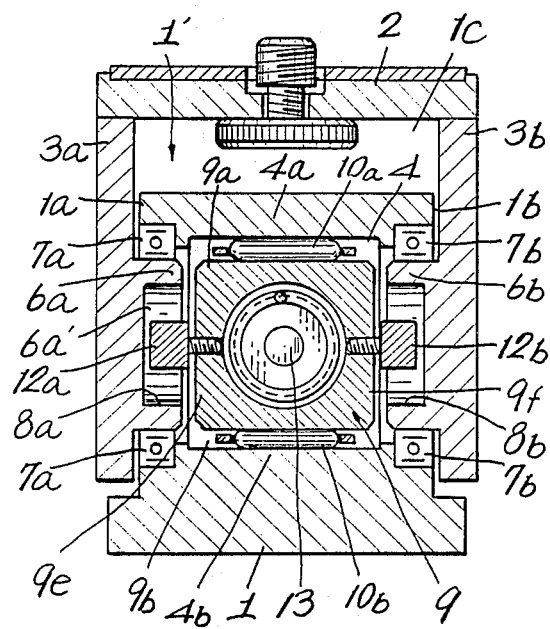
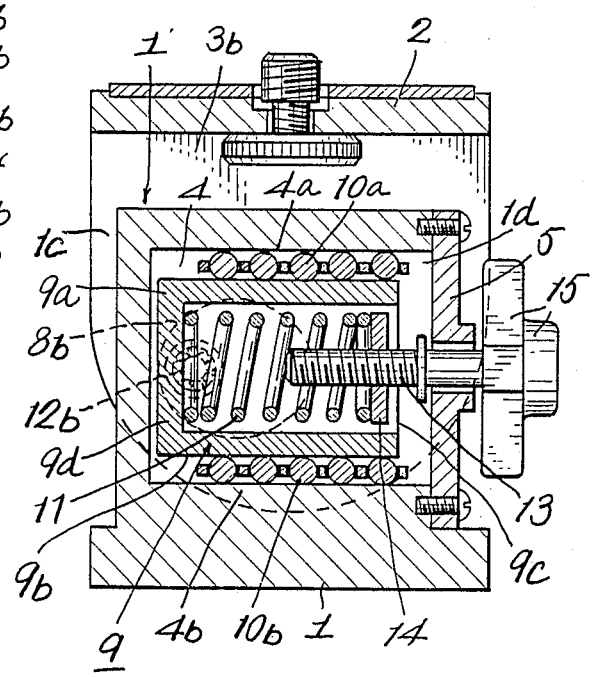

COUNTER-BALANCING MECHANISM FOR CAMERA UNIVERSAL HEAD

BACKGROUND OF THE INVENTION

The present invention relates to a universal head for rotating vertically in both direction the camera of a video camera, cinematograph camera unit, and, in particular, to a counter-balancing mechanism for practically balancing rotative moments caused by the movement of the gravity center of the unit by the weight of said camera.

So far there have been encountered some cases where because of rollers lying transversely in a box-like space above a base support, these counter-balancing mechanism have limitations on the length of the spring for such a balancing which is a energy source for said balancing; and therefore a large-size of the unit has been imperative to achieve a perfect balancing.

SUMMARY OF THE INVENTION

The purpose of the present invention is to provide the counter-balancing mechanism for a camera universal head, wherein a perfect counter-balancing is effected and the whole unit can be further formed in a small size, comprises The objective of the invention will be achieved by a mechanism,, wherein, a camera universal head journaling to support vertivally rotatively in both direction at two axial pieces protrudingly provided in symmetry at the inside of side plates of the head a camera mounting table on a base support form rotatively in both direction literally, comprises a box-like hollow space provided on said base support to insert a spring receiving seat in said hollow, space so as to make said seat slidable in the direction right angle in a plane to the protruding direction of said axial pieces;

each recessed portion provided on the end surface of each said axial piece to form a cam surface in eccentricity to the center of said piece on the circumferential surface of said recessed portion; and two protruding rollers provided on said spring receiving seat to be made in suppressing contact with said respective cam surfaces by said spring receiving seat energized by a spring therein.

BRIEF DESCRIPTION OF THE DRAWINGS

FIG. 1 is a plan of a camera universal head provided with the counter-balancing mechanism of a camera universal head in accordance with the present invention, FIG. 2 a sectional view along the line X—X' in FIG. 1, FIG. 3 a sectional view along the line Y—Y' in FIG. 2, and, FIG. 4 a knock-down perspective view thereof.

A PREFERRED EMBODIMENT OF THE INVENTION

Figure 4:
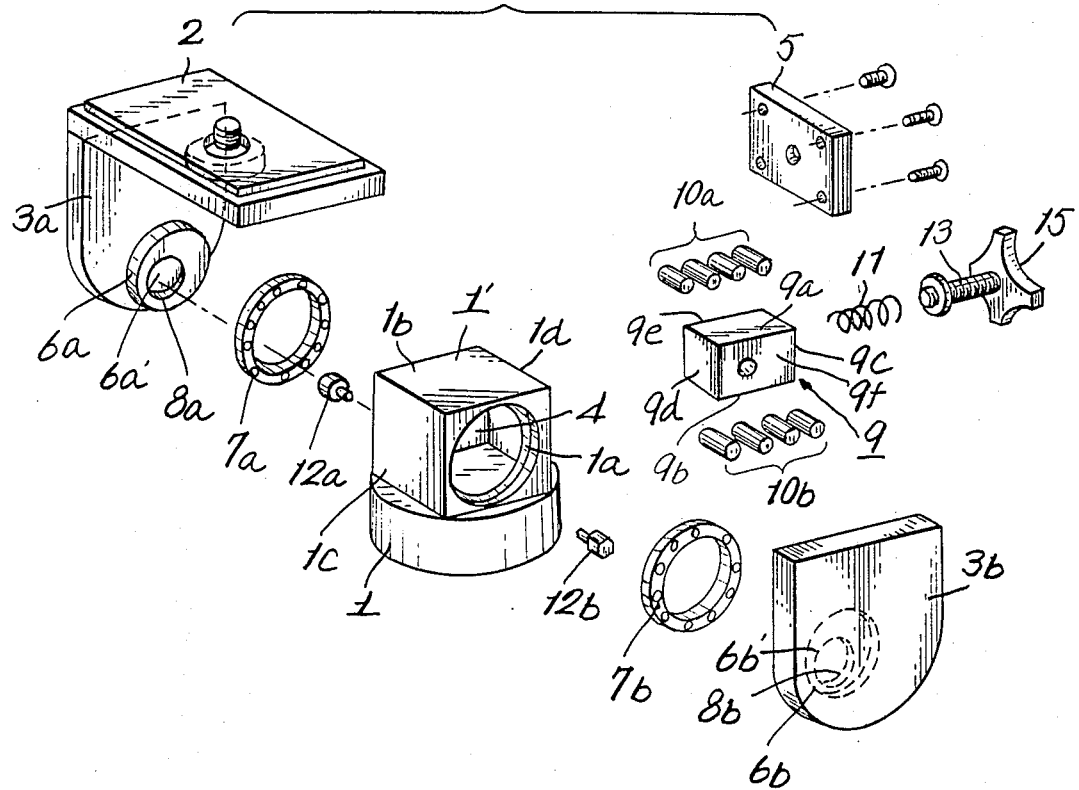

In the camera universal head of the invention, a box-like section (1') is formed laterally rotatively on the top of a base support (1), and on the box-like section (1') vertically rotatively in both directions side-plates (3a) and (3b) fixed hanging vertically on both side symmetrically on the underside of a camera mounting table (2).

The inside of said box-like section (1) is formed into a box-like hollow space, and one opposite side (1a), (1b) of said section (1') are open, and communicate with said hollow space (4). Only one side (1d) of the other opposite sides (1c), (1d) is open, and a cover plate (5) is detachably screwed on by set screws to cover said open side (1d).

As a means to assemble said side-plates (3a), (3b) vertically rotatively in both direction to the top of the base support (1), the axial piece (6a), (6b) protrudingly provided in symmetry positions on the inner surface of the side-plates (3a), (3b) are fitted insertingly into bearings (7a), (7b) mounted on the one open opposite sides (1a), (1b) of the box-like section (1') in order to rotatively assemble the side-plates vertically in both direction. The axial pieces (6a), (6b) have recessed portions (6a'), (6b') open to the box-like hollow space (4). On the inner circumferential surfaces of said recessed portions (6a'), (6b') are formed cam surfaces (8a), (8b). Said cam surface (8a), (8b) are formed into the circular surfaces eccentric to the central line of the axial pieces (6a), (6b).

Within said box-like hollow space (4), a spring receiving seat (9) is placed insertingly in the direction of the other opposite side (1c), (1d), i.e. in the direction making right angle to the axial pieces (6a), (6b). That is, the spring receiving seat (9) is formed into a U-like sectional shape having an opening (9c) facing to a cover-plate (5), and is assembled within the hollow space (4) slidably in the direction of the other opposite sides (1c), (1d) or in the direction of the inner surface of the side (1c) or the innermost wall of the hollow space and cover plate (5) by placing sliding bearings (10a), (10b) between the top and bottom surface (9a), (9b) of the spring receiving seat (9) and the top and bottom inner surface (4a), (4b) of the box-like hollow space (4). On the side (9e), (9f) of the spring receiving seat (9) corresponding to the axial pieces (6a), (6b) are protrudingly provided rollers (12a), (12b) rolling along the cam surfaces (8a), (8b) of said axial pieces (6a), (6b) and in offset adjacent to the innermost wall of the hollow space (4) or side (1c).

A coil spring (11) is supported fittingly within the sectionally U-shaped hollow space of the spring receiving seat (9) in a state the coil spring (11) is in suppressing contact with the innermost wall of the spring receiving seat (9), and said coil spring (11) energizes the spring receiving seat (9) in the direction to the innermost wall opposite to the side cover plate (5) of the box-like hollow space (4) or inner surface of the side (10) of the box-like section (11), and simultaneously the rollers (12a), (12b) in suppressing contact with the cam surface (8a), (8b) formed in the inner circumferential surfaces of the recessed portion (6a'), (6b') of the axial pieces (6a), (6b). In the embodiment shown in the drawings, as a means to support the coil spring (11), a spring retaining plate (14) mounted to a bolt 13 screwed into the cover plate 5 supports the coil spring (11), and an example of the regulating device has been shown that adjusts the suppressing pressure of rollers (12a), (12b) against the cam surfaces (8a), (8b) or the suppressing force of the coil spring (11) by the spring retaining plate (14) by rotating the handle (15) mounted to the said bolt 13 screwed into the cover plate (5); and, however, the coil spring (11) may be supported by the cover plate (5) without using said regulating device.

For means for effecting the balancing for gravitational force changes in rotating the camera mounting plate of a camera universal head in a vertical direction relative to the base support, there exist a mechanism wherein the height of center of gravity remains unchanged during such rotations, and a mechanism wherein the energy loss due to displacements of center of gravity is counter-balanced; and the present invention is a mechanism belonging to the latter, and is intended to give a spring a potential energy of a elastic body corresponding the potential gravitational energy lost by the displacement of center of gravity.

The cam surfaces (8a), (8b) with eccentricity to the center of the axial pieces (6a), (6b) will rotate with eccentricity along with the inclination of the camera mounting table (2), and therefore the cam surfaces (8a), (8b) suppresses the rollers (12a), (12b), which in turn compress the spring (11) via the spring receiving seat (9). The objective of the invention will be achieved by so forming the shapes of the cam surfaces (8a), (8b) that the spring may here store the energy equivalent to the potential energy lost by the downward movement of center of gravity of the leaded items such as the camera and others caused by the inclination of the camera mounting table (2). The optimum shape of the cams is determined by the product of the weight of laded items to be balanced by the height of its center of gravity of these items from the center of rotation of the camera universed head, the spring constant, the initial comprised length of the spring, (the compression length at inclination angle 0°), the diameters of the rollers (12a), (12b) the initial positions of the cam surfaces (the position at inclination angle 0°), and others; and, though it is difficult to express in a general formula, it has been found that an approximately circular shape will provide a practically sufficiently correct counter-balancing according to calculated results by computers, and experiments.

The present invention provides sufficient counter-balancing and a unit to be formed in a small size because of no need for crossing the box-like hollow space by the rollers for making counter balancing and consequently for giving any limitations on the length of the spring.

What is claimed is:

1. A counter-balancing mechanism for a camera universal head journaling to support vertically rotatively in both direction at two axial pieces protrudingly provided in symmetry at the inside of side plates of said head a camera mounting table on a base support formed rotatively in both direction laterally, comprising;

a box-like hollow space provided on said base support to insert a spring receiving seat into said hollow space so as to make said seat slidable in the direction right angle in a plane to the protruding directions of said axial pieces;

each recessed portion provided on the end surface of each said axial piece to form a cam surface in eccentricity to the center of said piece on the circumferential inner surface of said recessed portion; and two protruding rollers provided on said spring receiving seat to be made in suppressing contact with said respective cam surfaces by said spring receiving seat energized by a spring therein.

2. A counter-balancing mechanism for a camera universal head claimed in claim 1, wherein a regulating device for adjusting the energizing force of said spring is related to set on said spring.

* * * * *